United States Patent [19]
Landi et al.

[11] Patent Number: 5,701,621
[45] Date of Patent: *Dec. 30, 1997

[54] LINER FOR OVERLAYING A MATTRESS

[75] Inventors: Curtis L. Landi; Susan L. Wilson, both of Sunnyvale, Calif.

[73] Assignee: Supracor Systems Corporation, San Jose, Calif.

[*] Notice: The term of this patent shall not extend beyond the expiration date of Pat. No. 5,444,881.

[21] Appl. No.: 278,181

[22] Filed: Jul. 21, 1994

Related U.S. Application Data

[63] Continuation-in-part of Ser. No. 80,745, Jun. 22, 1993, Pat. No. 5,444,881, which is a continuation-in-part of Ser. No. 974,474, Nov. 12, 1992, abandoned, which is a continuation-in-part of Ser. No. 717,523, Jun. 19, 1991, Pat. No. 5,180,619, which is a continuation-in-part of Ser. No. 446,320, Dec. 4, 1989, Pat. No. 5,039,567.

[51] Int. Cl.$^6$ .................... A47C 27/00; A47C 27/08; B32B 3/12
[52] U.S. Cl. .................... 5/691; 5/708; 5/652.1; 5/948; 428/73; 428/116
[58] Field of Search ............... 5/448, 449, 450, 5/453, 454, 654, 653, 469, 470, 457, 484, 690, 706–710, 652–657; 297/DIG. 3, 452.21, 452.23, 452.25, 452.41, 452.42; 428/116, 118, 73, 131

[56] References Cited

U.S. PATENT DOCUMENTS

| | | | |
|---|---|---|---|
| 5,039,567 | 8/1991 | Landi et al. | 428/116 |
| 5,134,790 | 8/1992 | Woitschaetzke et al. | 36/28 |
| 5,152,081 | 10/1992 | Hallenbeck et al. | 36/28 |
| 5,180,619 | 1/1993 | Landi et al. | 428/116 |
| 5,203,607 | 4/1993 | Landi | 297/DIG. 1 |

*Primary Examiner*—Alexander Grosz
*Attorney, Agent, or Firm*—Claude A. S. Hamrick

[57] ABSTRACT

An improved pad or liner for overlaying a mattress, including at least one panel having a flexible thermoplastic elastomeric honeycomb core encased within a permeable fabric covering. The honeycomb core is formed of undulated strips of resilient thermoplastic material, thermal compression bonded together to form cell walls defining a plurality of contiguous regularly shaped cells having an upper and a lower extremity. The cell walls of the core are formed with a plurality of perforations. The upper extremities of each cell wall are planarized and a perforated facing sheet is thermal compression bonded to the lower extremities of each cell wall. The planarized extremities and the facing sheet maintain and retain the cells of the honeycomb core in their expanded configuration so that the core can anisotropically flex to stabilize and spread the load exerted by a user of the mattress pad.

20 Claims, 14 Drawing Sheets

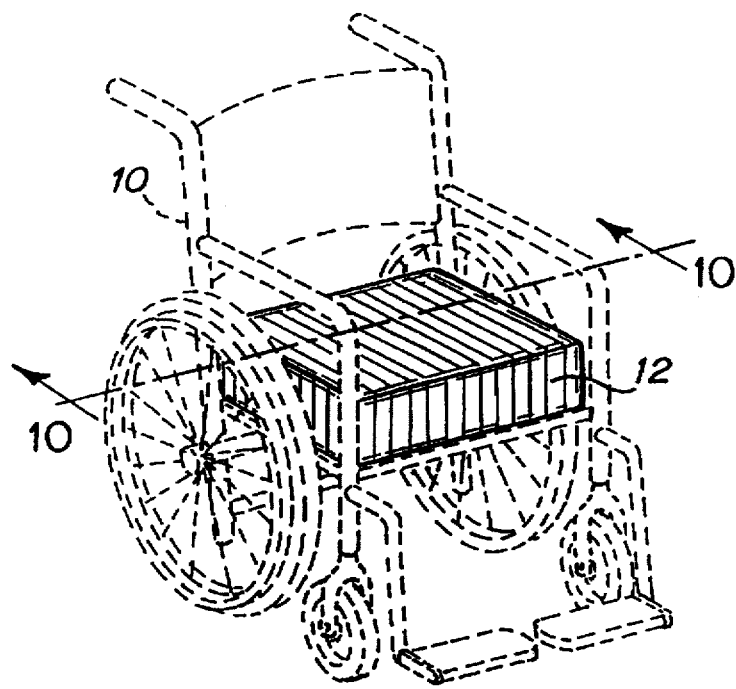
Fig_1
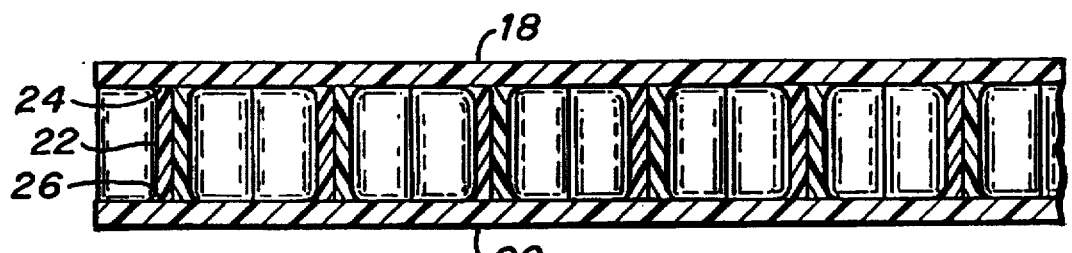
Fig_3
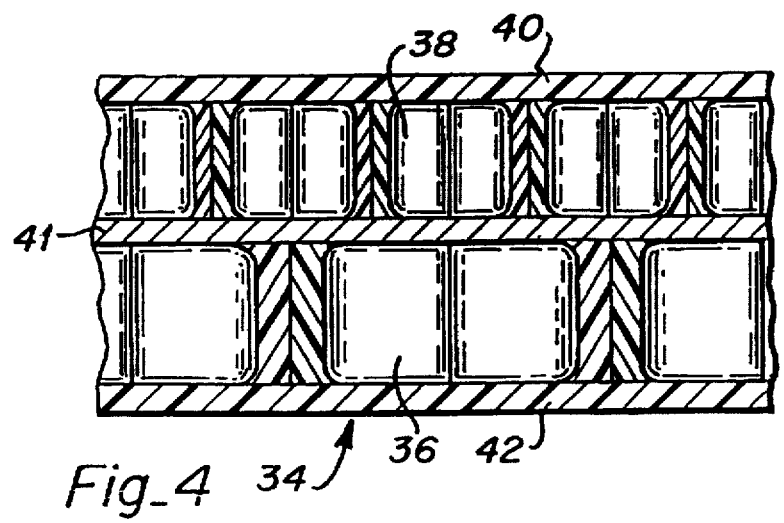
Fig_4

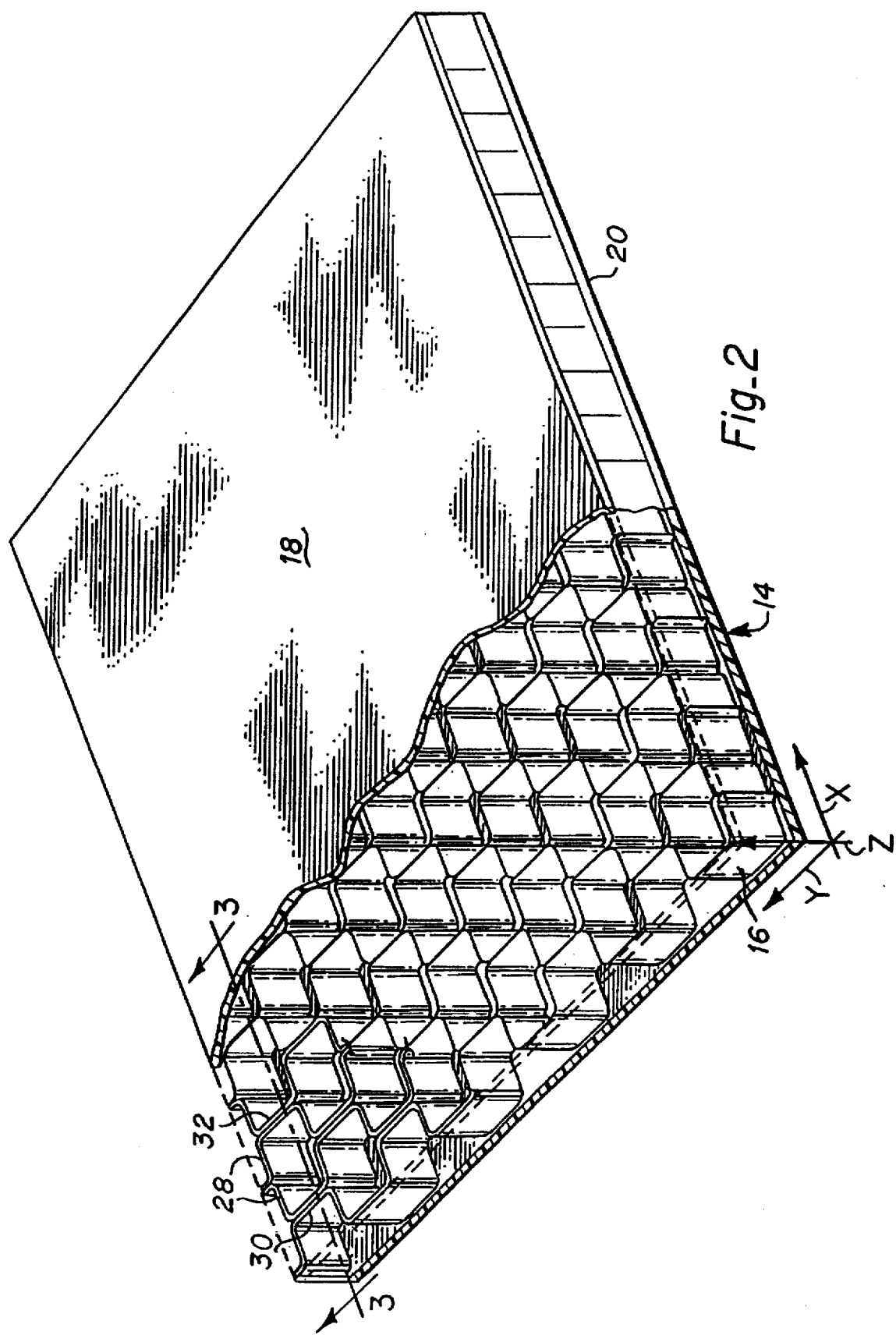
Fig_2

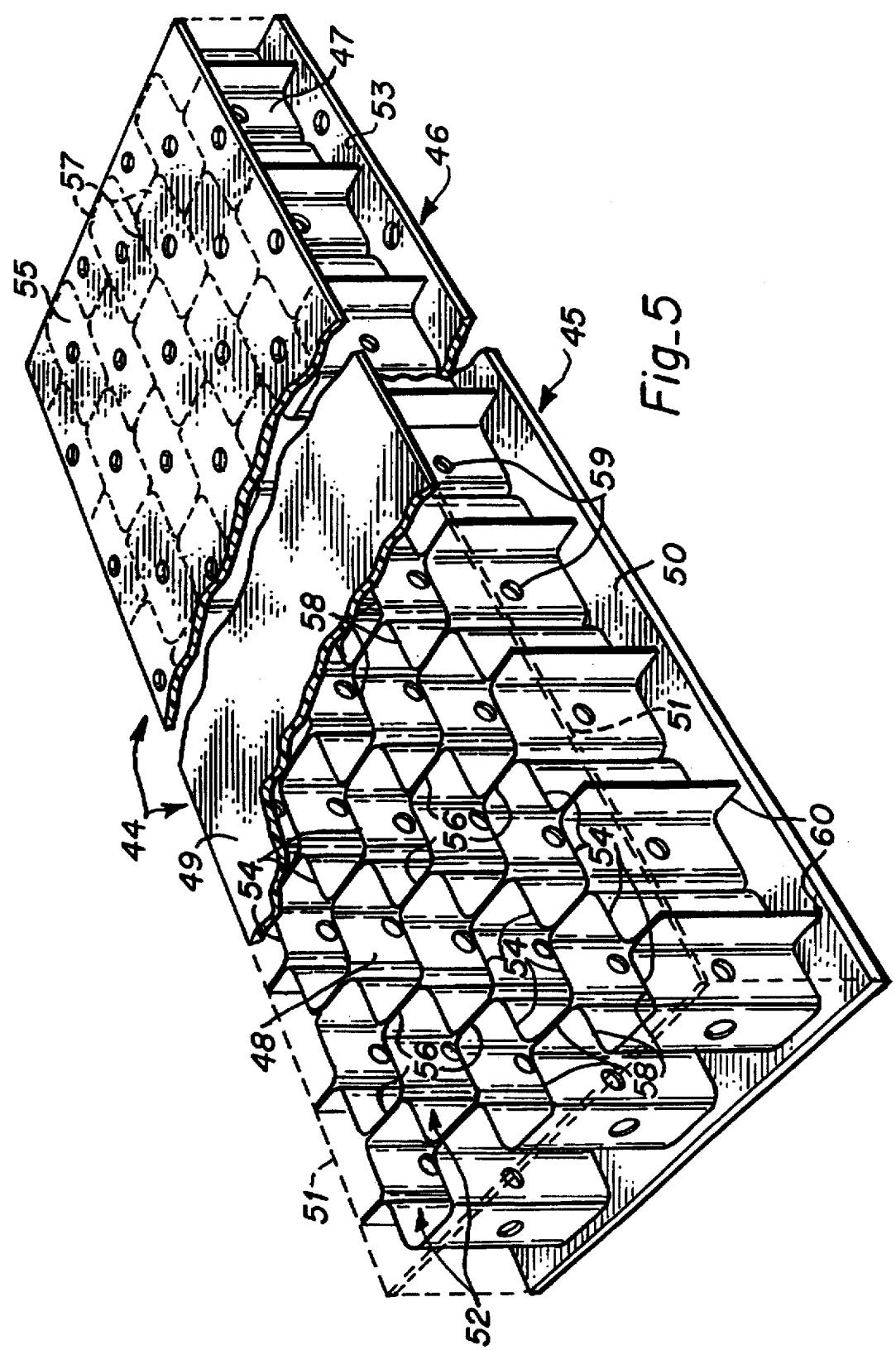
Fig_5

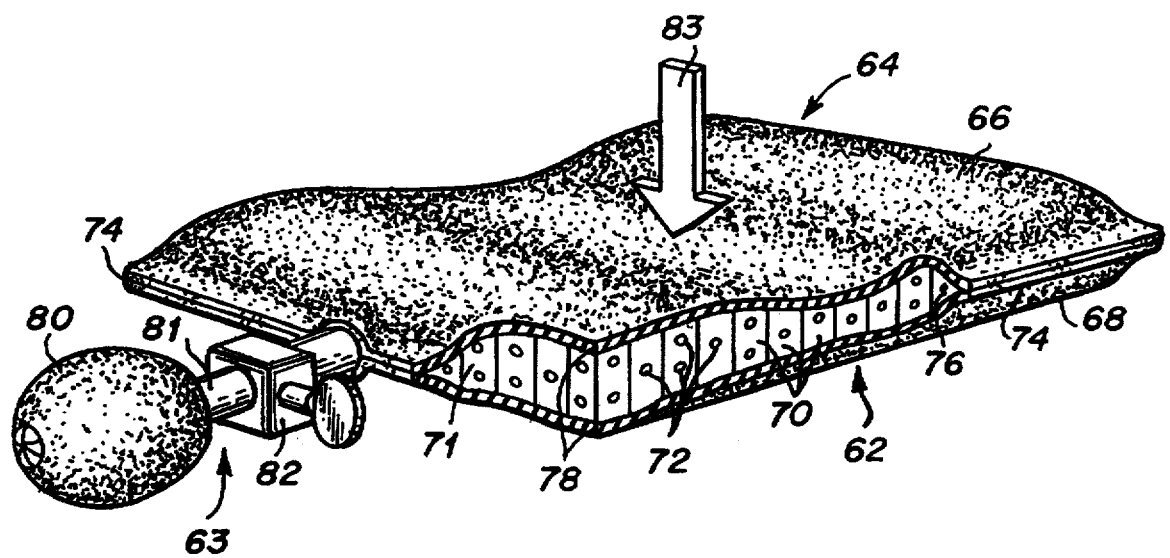
Fig_6

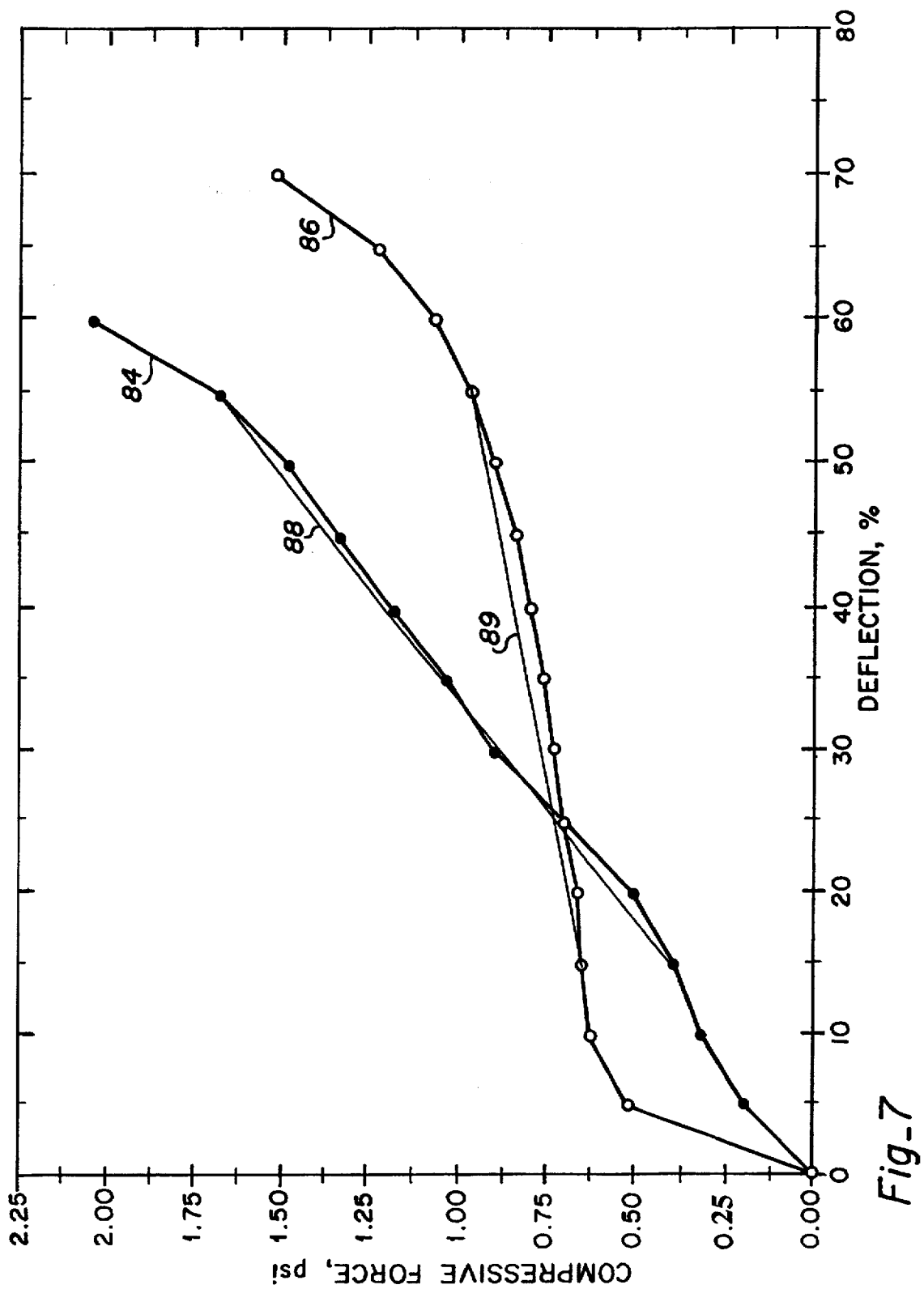
Fig_7

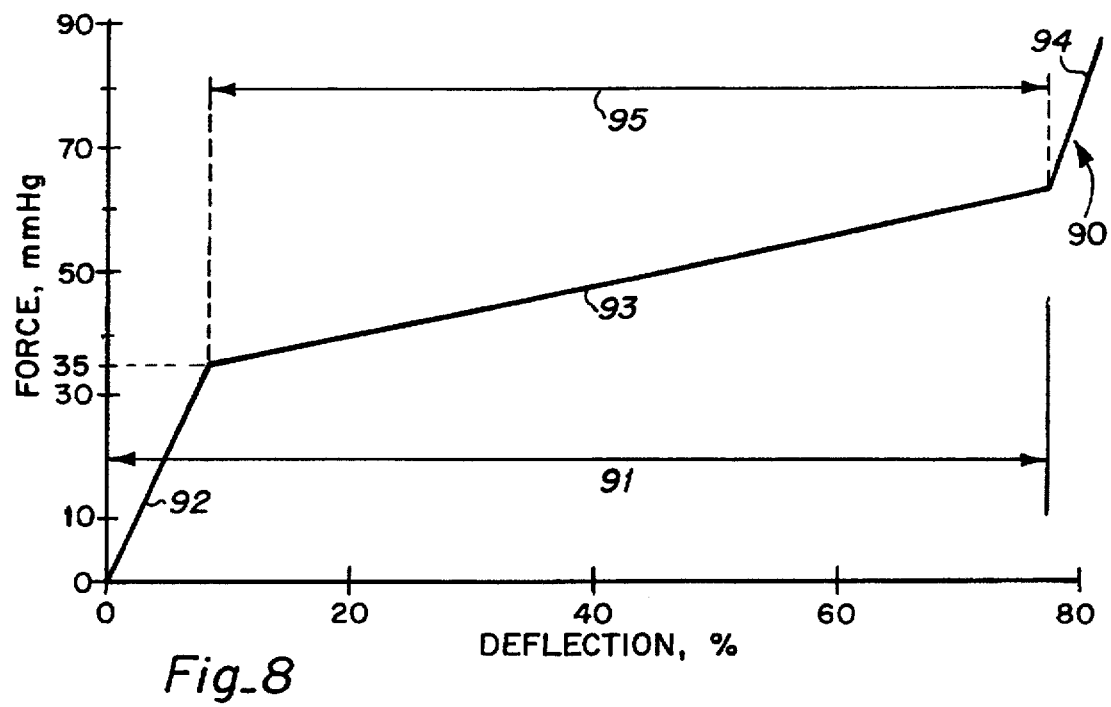
Fig_8
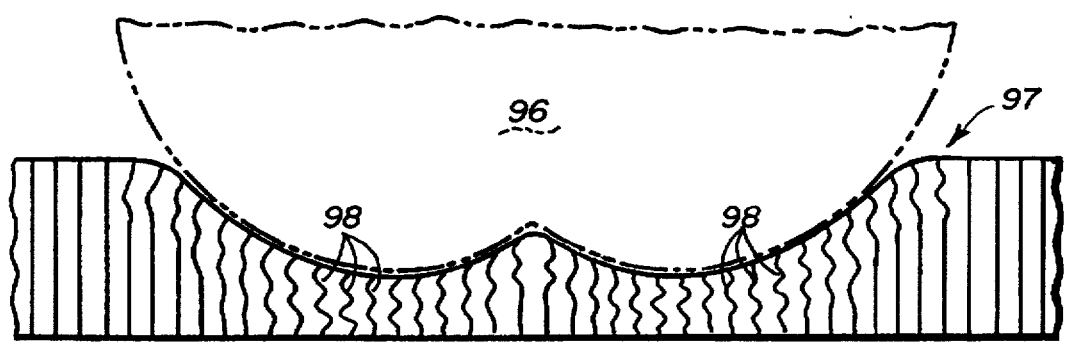
Fig_9

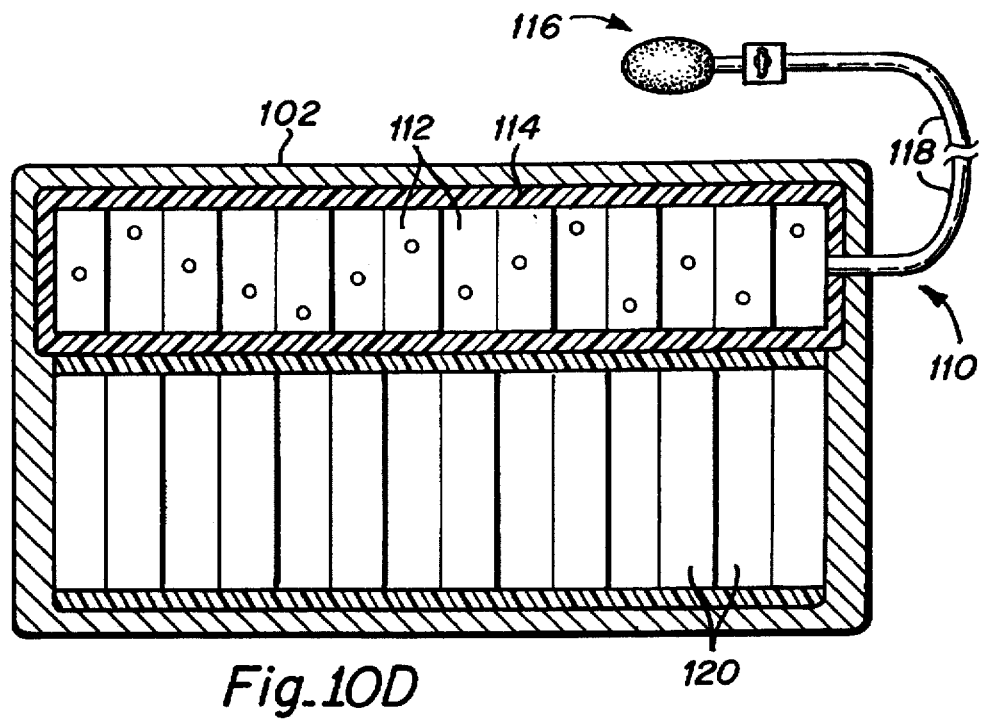
Fig._10D
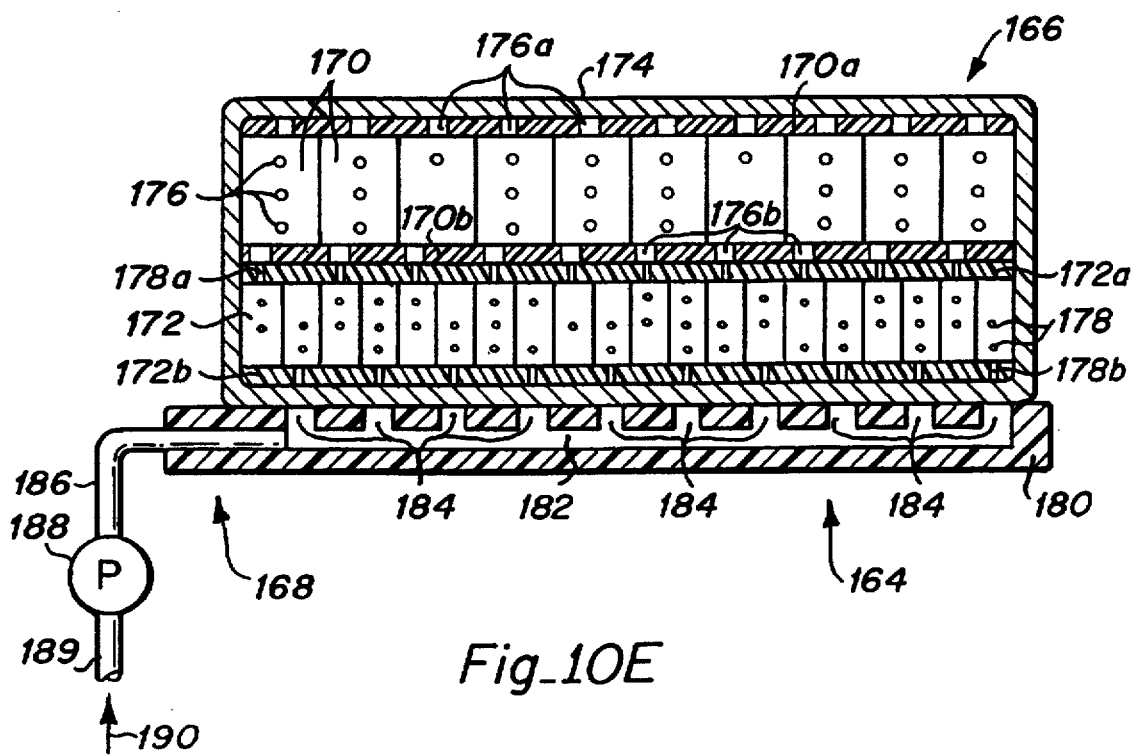
Fig._10E

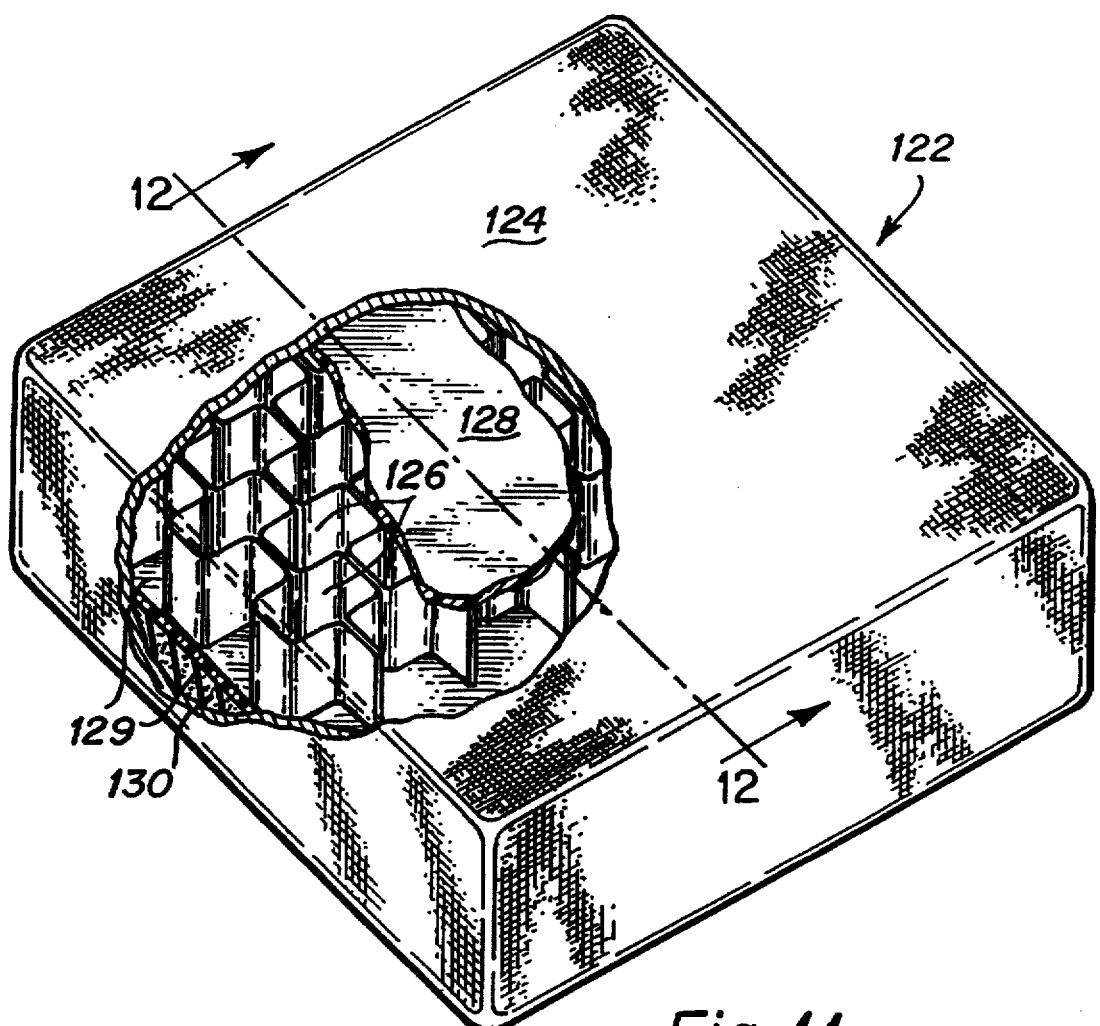
Fig_11
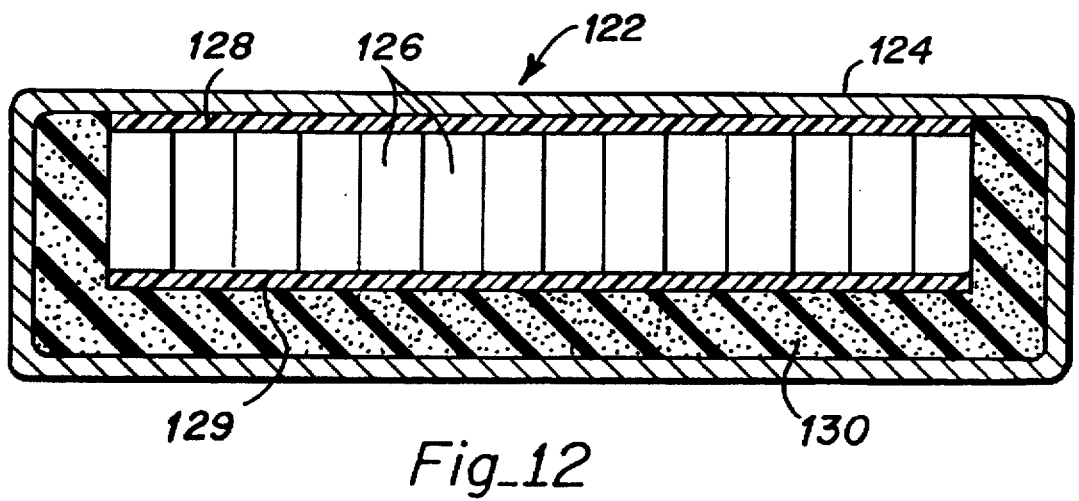
Fig_12

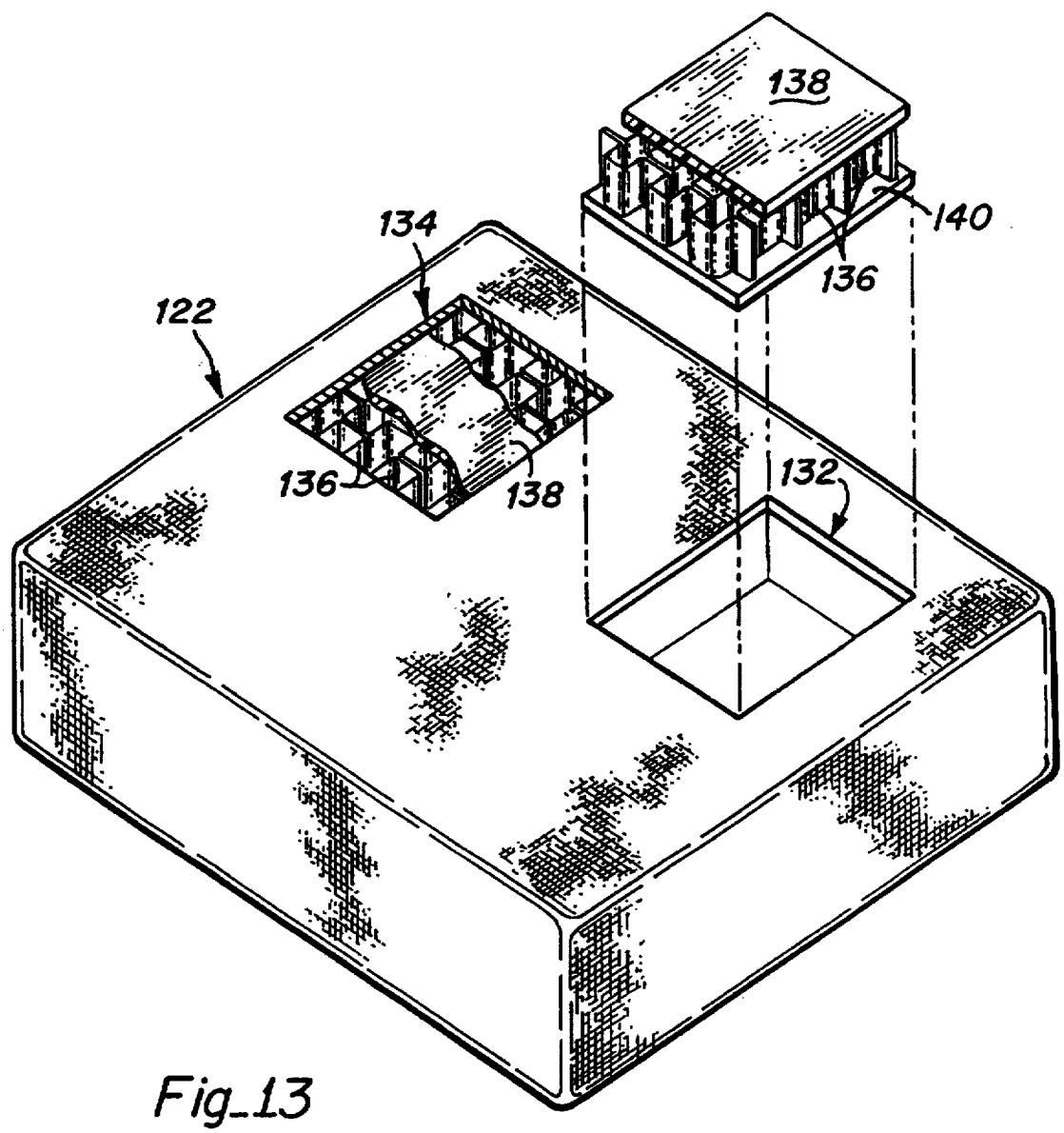
Fig_13

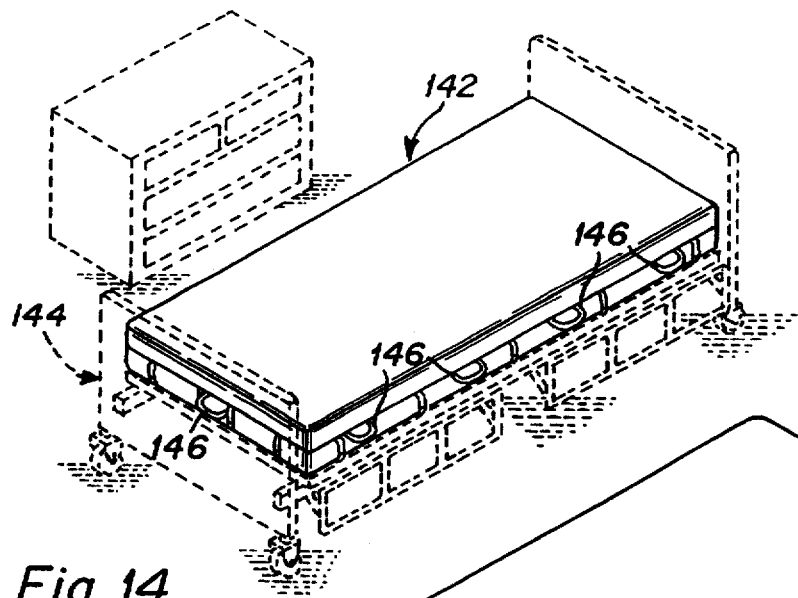
Fig_14
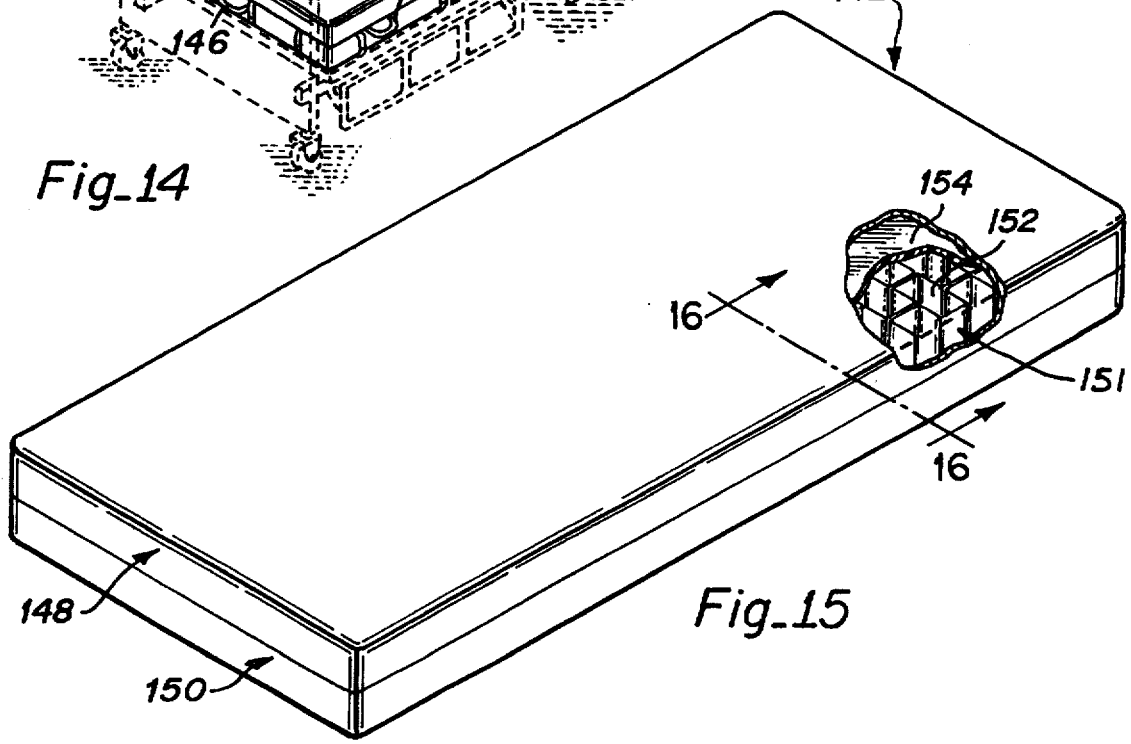
Fig_15
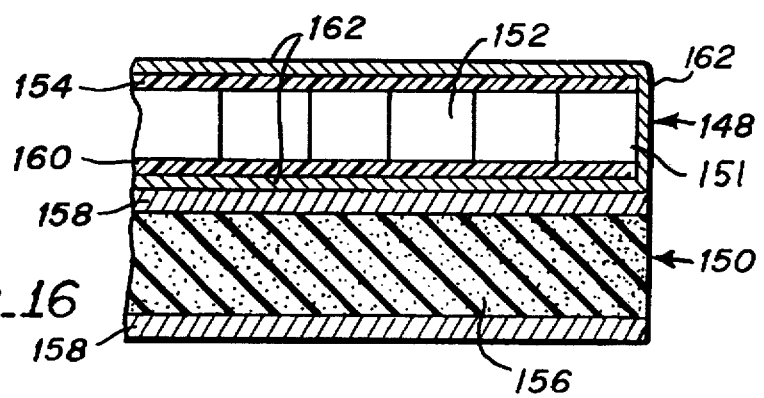
Fig_16

LINER FOR OVERLAYING A MATTRESS

CROSS-REFERENCE TO RELATED APPLICATIONS

This application is a continuation-in-part of our U.S. application Ser. No. 08/080,745 filed Jun. 22, 1993 now U.S. Pat. No. 5,444,881, which is a continuation-in-part of our U.S. application Ser. No. 07/974,474 filed Nov. 12, 1992 now abandoned which is a continuation-in-part of Ser. No. 717,523 filed Jun. 19, 1991, now our prior U.S. Pat. No. 5,180,619 entitled "Perforated Honeycomb," which is a continuation in part of Ser. No. 446,320 filed Dec. 4, 1989, now our prior U.S. Pat. No. 5,039,567 entitled "Resilient Panel Having Anisotropic Flexing Characteristics and Method of Making Same."

BACKGROUND TO THE INVENTION

1. Field of the Invention

The present invention relates generally to an anatomical support cushion, and more particularly to a liner or pad for overlaying a mattress, the liner having at least one flexible thermoplastic elastomer honeycomb panel.

2. Description of the Prior Art

Substantially immobile people (e.g. bed or wheelchair bound users) have a great need for support cushions that minimize the development of decubitus ulcers (i.e. bedsores) which can occur during long periods of confinements to beds or chairs.

Traditionally, foam and gel-filled materials have been used in such cushions to absorb shock and provide support. For example, some seat cushions include a foam cushion encased within a washable covering, wherein the foam cushion is formed to provide a comfortable supporting surface. The foam cushion may have a cut-out or contact-free zone formed through it to reduce pressure on the user's spine or coccyx (i.e. tailbone), or to eliminate physical contact between the cushion and particularly sensitive portions of the user's body.

In other cushions, the foam is specially tapered to enable the user to more easily rise from and lower onto the cushion. Tapering the foam helps reduce high pressure areas, but only if the user's anatomy fits the contours of the tapered foam. High pressure points will still occur if the user has an abnormal anatomy (frequently, users will have a different anatomy corresponding to different disabilities), is an amputee, or is improperly positioned on or changes positions on the cushion.

In yet other prior art cushions, a gel or other fluid-like substance fills an impermeable sack which is disposed within or on a foam envelope. The entire assembly is encased within a moisture resistant cloth, vinyl and/or urethane, or waterproof covering and placed on a seat or mattress. In some cases the gel-filled cushion is formed with contours or contact-free zones to relieve contact and pressure on sensitive portions of the user's body. For example, U.S. Pat. No. 5,191,752 (Murphy), discloses a seat cushion formed from silicon dielectric gel, which is used in an equestrian saddle. The gel cushion, although somewhat shock absorbent, is heavy and prone to damage from punctures and the like. U.S. Pat. No. 5,201,780 (Dinsmoor, III et al.) discloses a tri-layered mattress pad. The pad includes a cover or casing containing an interior strata of a plastic film layer atop a fluid bladder layer supported on a foam layer. The pad is designed to reduce the development of bedsores by reducing normal and lateral pressures and forces on the bed user. As discussed below, there are shortcomings associated with using foam and gel-filled materials in cushions.

One shortcoming of gel is that it retains heat. During continuous periods of contact with a user's body, in an area of contact between the user and the gel-filled cushion, the body heat of the user is transferred into the gel disposed proximate the contact area. The temperature of the gel increases causing discomfort for the user and exacerbating any existing injuries (e.g. bedsores) the user may have. Perspiration also increase from the region of the user's body in contact with the cushion. This moisture increase creates an unsanitary condition for the user because bacterial growth in the contact area is promoted and existing injuries are likely to become infected.

Also, gel-filled cushions disposed in the wheelchairs of athletic users are especially uncomfortable. During outdoor athletic activity (i.e. during exposure to sunlight) or during periods of physical exercise, the temperature of the gel material reaches and remains at high levels. The gel material remains hot even when the user stops exercising and attempts to cool down.

Further, gel-filled cushions are relatively heavy, and are especially vulnerable to damage or destruction from puncturing.

There are also shortcomings associated with foam materials. Foam materials, for example, are susceptible to taking a compression set after many periods of use. After prolonged periods of use the foam cells collapse and the support benefit of the cushion is lost. Also, foams cushions must be encased within impermeable coverings because foams readily absorb fluids. A foam cushion must be replaced if incontinence or an accidental spill wets a cushion with a torn covering.

Some wheelchair cushions utilize pneumatic devices as a pressure relieving system for reducing ischemic injury. U.S. Pat. No. 5,193,237 (Holdredge), for example, discloses a pneumatic wheelchair cushion having a number of separate unattached air sacks arranged in a matrix. Reduced airflow is periodically provided within the cushion so that each air sack will have reduced pressure for a predetermined period of time. A self-regulating air distribution is provided such that when the occupant shifts his/her weight so as to overcome the air pressure in a sack, the system automatically backflows air into that particular sack thereby cushioning the user. The disclosed wheelchair device is complex, and requires electrical power and pressurized air. Such devices are overly complicated, costly to acquire, and costly to maintain.

Prior art mattresses include a matrix of air cells that are inflated and deflated to more evenly support bodies and reduce the development of bedsores. In addition to the air supply components (e.g. compressor, valving, tubing, etc.), a computer is needed to constantly measure the resistance in each air cell and to control the reaction of each air cell to pressure and load changes by varying the deflation and inflation in each cell. Thus, such mattresses are also costly and complicated.

Honeycomb structures used in personal articles are also known. For example, U.S. Pat. Nos. 5,134,790 (Woitschaetzke et al.) and 4,485,568 (Landi et al.) disclose using resilient honeycomb structures in the sole of shoes. Also, U.S. Pat. No. 4,422,183 (Landi et al.) discloses a protective body shield having a honeycomb structure constructed from a resilient flexible material. Finally, U.S. Pat. No. 5,203,607 (Landi et al.) discloses an improved bicycle seat including a rigid shell supporting a foam layer having a pad of thermoplastic elastomer honeycomb disposed within or thereon.

There remains a need to provide an improved mattress liner that maximizes pressure relief, stability, comfort, durability, maintainability, and weight, yet does not possess the shortcomings of foams, gels, and other materials.

SUMMARY OF THE INVENTION

Objects of this Invention

It is therefore an object of the present invention to provide an improved pad or liner for a mattress, that provides improved pressure relief and stability characteristics, significant compression set resistance, durability, low weight, and low maintenance properties.

It is another object of the present invention to provide an improved pad or liner for a mattress, having at least one thermoplastic elastomer honeycomb panel that conforms, supports, and stabilizes a wide variety of positions, user anatomies and disabilities.

It is still another object of the present invention to provide an improved pad or liner for a mattress, that is breathable to permit cooling of the user.

It is yet another object of the present invention to provide an improved pad or liner for a mattress, that allows moisture or fluids to drain from one layer to another layer thereby keeping the layer, engaged with a user's skin, dry.

Another object of the present invention is to provide an improved pad or liner for a mattress, that can be constructed with the desired cushioning and stabilizing characteristics without having to introduce elements such as foam, gels or other elements which add cost or reduce durability.

Yet another object of the present invention is to provide an improved pad or liner for a mattress, constructed of antifungal and antibacterial materials.

Still another object of the present invention is to provide an improved pad or liner for a mattress, constructed of materials that are fast drying, and can be easily disinfected and sterilized by chemical wash, microwave, detergent, or other means.

Briefly, an improved pad or liner for overlaying a mattress includes at least one panel having a flexible thermoplastic elastomeric honeycomb core encased within a permeable fabric covering. The honeycomb core is formed of undulated strips of resilient thermoplastic material, thermal compression bonded together to form cell walls defining a plurality of contiguous regularly shaped cells having an upper and a lower extremity. The cell walls of the core are formed with a plurality of perforations. The upper extremities of each cell wall are planarized and a perforated facing sheet is thermal compression bonded to the lower extremities of each cell wall. The planarized extremities and the facing sheet maintain and retain the cells of the honeycomb core in their expanded configuration so that the core can anisotropically flex to stabilize and spread the load exerted by a user of the mattress pad.

An important advantage of the present invention is that the thermoplastic elastomer honeycomb panel used in the construction of the pad or liner for a mattress, is an anisotropic material having improved pressure relief, stability, compression set resistance, durability and low maintenance characteristics.

Another advantage of the present invention is that single or multiple thermoplastic elastomer honeycomb panels may be configured within the pad or liner for a mattress to customize and individually tailor it for an individual user.

Yet another advantage of the present invention is that the pad or liner for a mattress, can support and conform to a wide range of user positions, user anatomies and disabilities.

Still another advantage of the present invention is that the pad or liner for a mattress, may be constructed from a perforated core thermoplastic elastomer honeycomb panel that is breathable to allow perspiration removal and cooling of the apparatus user.

Another advantage of the present invention is that different thermoplastic elastomer honeycomb core designs or multiple panels of different thermoplastic honeycomb core designs may be utilized to maximize design flexibility of the pad or liner.

Still another advantage of the present invention is that the thermoplastic elastomer honeycomb core is fabricated from recyclable materials that are fast drying, and easily disinfected and sterilized.

These and other objects and advantages of the present invention will no doubt become apparent to those skilled in the art after having read the following detailed description of the preferred embodiment which is contained in and illustrated by the various drawing figures.

BRIEF DESCRIPTION OF THE DRAWINGS

In the accompanying drawings:

FIG. 1 is a perspective view illustrating a wheelchair having disposed thereon an improved anatomical support cushion constructed in accordance with a preferred embodiment of the present invention;

FIG. 2 is a perspective view illustrating a thermoplastic honeycomb panel of the type utilized in the improved anatomical support cushion shown in FIG. 1, wherein the panel has a non-perforated honeycomb core;

FIG. 3 is a partial cross-section taken through the line 3—3 of the panel illustrated in FIG. 1 to illustrate the structural characteristics of one embodiment of the panel;

FIG. 4 is a partial cross-section illustrating an alternative embodiment of the panel illustrated in FIG. 2;

FIG. 5 is a perspective view of another thermoplastic honeycomb panel of the type utilized in the improved anatomical support cushion shown in FIG. 1, wherein the panel is shown with a non-perforated facing sheet broken away to reveal a perforated honeycomb core, and also illustrated is a separate section of the panel having a perforated honeycomb core as well as a perforated facing material;

FIG. 6 is a partially broken depiction of a thermoplastic honeycomb panel, similar to the panel illustrated in FIG. 5, communicatively coupled to a bulb pump;

FIG. 7 depicts a force deflection comparison plot between a seat cushion utilizing foam or gel materials and an improved cushion having a thermoplastic honeycomb panel of the present invention;

FIG. 8 illustrates the idealized honeycomb cushion design parameters;

FIG. 9 illustrates the buttressing effect of the cells of a thermoplastic flexible honeycomb panel of the present invention when loaded by a wheelchair user;

FIG. 10A through 10E are cross-sectional views of the cushion illustrated in FIG. 1 wherein alternative thermoplastic flexible honeycomb panel configurations are illustrated;

FIG. 11 is a perspective view of a flexible thermoplastic honeycomb panel of the type illustrated in FIG. 1, partially broken to show a flexible honeycomb core insert disposed on a conventional foam cushion;

FIG. 12 is a cross-sectional view of the panel illustrated in FIG. 11;

FIG. 13 is a perspective view of an improved anatomical support cushion having a foam layer and a plurality of independent flexible thermoplastic honeycomb pad sections that are fitted into cavities pre-formed within the foam layer;

FIG. 14 is a perspective view of an improved pad or liner of the present invention disposed onto a conventional mattress supported by a standard hospital bed frame;

FIG. 15 is an enlarged perspective view of an improved pad or liner shown in FIG. 14, partially broken away to illustrate the honeycomb core;

FIG. 16 is a cross-sectional view of the improved pad or liner and the conventional mattress taken along the line 16—16 of FIG. 15;

DETAILED DESCRIPTION OF THE EMBODIMENT

Figure 10A:
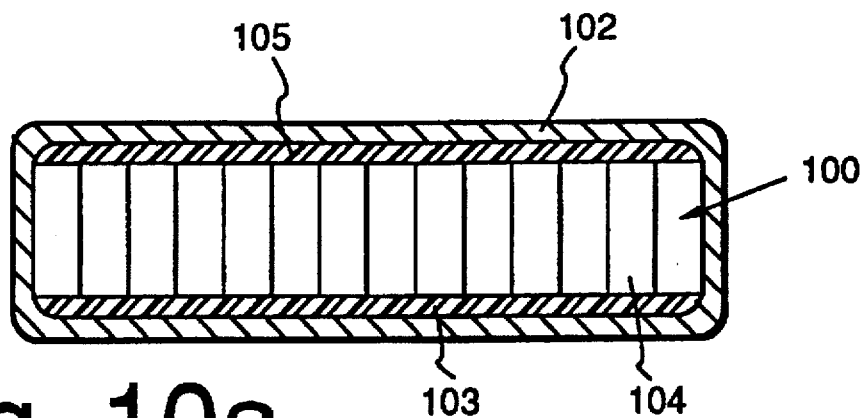

Referring now to FIG. 1 which depicts a conventional wheelchair 10 having disposed thereon a removable improved anatomical support cushion 12. As will be described in greater detail below, the cushion 12 is constructed of at least one flexible thermoplastic elastomer honeycomb core panel built in accordance with the present invention. It should be noted that, although the cushion 12 is particularly well suited for wheelchair applications, the cushion 12 may be used in a variety of other anatomical support applications (e.g., mattresses, automobile and airline seats, arm rests, seat belts, etc.).

Referring to FIG. 2 which illustrates a honeycombed panel 8 structure 14 constructed from thermoplastic elastomer materials. The panel 14 includes a honeycomb-like core preferably made of bonded together and expanded strips or ribbons 16 of plastic material to which facing sheets 18 and 20 of perhaps heavier gauge material are thermocompression bonded. The panel is an anisotropic three-dimensional structure having predetermined degrees of flex along the X, Y and Z axis. Each cell is formed, in part, by four generally S-shaped wall segments each of which is shared by an adjacent cell. In addition, each cell shares a double thickness wall segment with two adjacent cells.

Panel 14 has high tear and tensile strength and is highly resilient, with optimal compression load and shock absorption or distortion characteristics yet is extremely light weight. Selected combinations of elastomer material, honeycomb cell configurations, core thickness and facing material variables will determine the panel's characteristics of softness or hardness, resilient recovery rate and rigidity or flex as required for a particular application. The facing materials can be selected from a wide variety of films, including thermoplastic urethanes, foams, EVAs, rubber, neoprene, elastomer impregnated fibers and various fabrics, etc. The manufacturing and fabrication of the panel 14 is described in greater detail in our U.S. Pat. No. 5,039,567 and incorporated herein by reference.

FIG. 3 is a cross-sectional view taken along the line 3—3 of FIG. 2. As illustrated, each wall of the core will have a structure which resembles an I-beam, as indicated at 22, and upper and lower faces 24 and 26, either or both of which may be deformed during a planarization operation as disclosed in our above identified U.S. Patent to stabilize the honeycomb core and prevent the expanded strip from collapsing. The faces 24, 26 are firmly bonded to the facing sheets 18 and 20. In addition, as illustrated in FIG. 2, each cell will be formed of four generally S-shaped vertical wall segments 28 joined together with two wall segments 30 and 32 of double thickness. With the top and bottom edges of these walls bonded to the upper and lower facing sheets 18 and 20 a unitary honeycomb panel is provided with no seams or separations. Because of the high integrity of the bonds between the core and facing sheets, the anisotropic features of the structure will be uniform and predictable. In addition, as illustrated in FIG. 4, a multi-cored structure may be built up as depicted at 34. Such structure can include different core configurations 36 and 38 as well as different types of facing materials 40, 41, and 42. It will, of course, be appreciated that within a single core cell, dimensions may be varied by changing the dimensions and/or spacings of the bonding ribs used during the build-up of the core stack.

FIG. 5 is a perspective view of a perforated core (or perforated cell wall) honeycomb panel 44. The panel 44 is broken into two sections, a left hand section 45 and a right hand section 46 in order to more fully illustrate alternative embodiments. The left half 45 shows material having a perforated honeycomb core 48 and unperforated or solid facing sheets 49 and 50. The dashed lines 51 illustrate the normal full coverage of the top facing sheet 49.

The honeycomb core 48 is made from sheets of a selected grade thermoplastic elastomeric material that has been perforated such that a matrix of small holes 59 exists throughout. The sheets are compression bonded together in spaced intervals staggered between alternating sheets as described in our U.S. Pat. No. 5,039,567 and incorporated herein by reference. The resulting stack is then cut into strips which, when expanded, create a honeycomb network of elongated, generally hexagonally shaped cells 52.

Each cell 52 of the honeycomb core 48 is defined by four generally S-shaped wall segments, each interior wall of which is shared by an adjacent cell. The wall segments of each cell 52 include a single thickness wall portion 54 and a double thickness wall portion 56.

The upper and lower faces 58 and 60 of the walls forming several cells are deformed during a planarization operation as disclosed in our above-identified U.S. Patent to stabilize the honeycomb core and prevent the expanded strip stock from collapsing. Facing sheets 49 and 50, cut from sheets of resilient thermoplastic material, are then compression bonded to the upper and lower faces 58 and 60. The addition of the facing sheets 49 and 50 strengthens the core 48 and provides an ample surface for adhering another panel or other material.

The right half section 46 of the panel depicted in FIG. 5 includes a perforated honeycomb core 47 similar to the left hand section 45 of the panel, but has facing sheets 55 and 53 made of perforated material. Dashed lines 57 indicate the honeycomb pattern of the core 47 underneath the top facing sheet 55. By perforating both the honeycomb core and facings, the weight of the material is reduced while the resiliency and flexibility is increased. The weight is reduced because the perforations reduce the overall quantity of the material comprising the honeycomb and facings. Similarly, the flexibility is increased because there is less material to constrain each segment of the material from bending. The resiliency, or ability of the structure to spring back to its original form after being compressed, is also enhanced by virtue of the additional passages through which air can return to fill the cells. It will be appreciated that the resilient but damped restorative characteristics of the structure make it an excellent absorber of shock waves.

It should also be noted that the material of the ribbons of the core could be supplemented with antifungal, antibacterial additives in order to limit growth of bacteria or mitigate odors.

Referring now to FIG. 6 which depicts a pressurized honeycomb panel 62 including a pump subsystem 63, and a perforated core honeycomb panel subsystem 64.

The subsystem 64 includes a first facing sheet 66, a second facing sheet 68, and a flexible perforated honeycomb core 70. The core 70 is described in greater detail in our U.S. Pat. No. 5,180,619 which is hereby incorporated by reference. The core 70 includes cell walls 71 with perforations 72 and is affixed to the inside surfaces of the first facing sheet 66 and the second facing sheet 68. The facing sheets extend outwardly beyond the core 70 and are bonded together around their perimeters as indicated at 74 so as to form an enclosed chamber 76 which is hermetically sealed and adapted to contain a suitable gas. For purposes of illustration, the chamber walls are broken away as indicated at 78.

In order to permit the gas contained within the enclosed chamber 76 to be increased or decreased in volume or pressure, the pump subsystem 63 is communicatively coupled to the chamber 76. The subsystem 63 includes a bulb pump 80 that is coupled via a conduit 81 to the chamber 76. An exhaust valve 82 is installed in the conduit 81 and allows the chamber 76 to be vented to atmosphere. As will be appreciated by those skilled in the art, the selected addition or subtraction of gas into or out from the enclosed chamber 76 will result in a change in the force-dissipating characteristics or shock absorbing capabilities of the panel in response to applied forces such as illustrated by the arrow 83.

Honeycomb, and particularly anisotropic honeycomb has a number of beneficial characteristics for anatomical support applications in general, and particularly for mattress and seating applications where the disadvantages of more traditional materials, such as gels and foams, become particularly unacceptable. Important characteristics for general seating, and especially for wheelchair seating materials, include pressure relief (load spreading), comfort, stability, durability, low maintenance, light weight, and low transmissibility (good impact isolation).

Pressure relief is particularly important for wheelchair seating applications because local pressure spots, within the range of 60–80 mm Hg (1.16–1.55 psi), quickly develop into sores on relatively immobile people. Seat cushions having honeycomb panels of the present invention are ideal for use as wheelchair cushions because such panels have relatively flat force deflection characteristics. FIG. 7 shows a force-deflection plot 84 of a foam cushion compared to a force deflection plot 86 of a cushion having a honeycomb panel of the present invention. The modulus (i.e. compressive force divided by deflection) over a 15 to 55 percent deflection range, for foam is depicted by a line 88. The modulus, over the same deflection range, for honeycomb of the present invention is depicted by a line 89. The figure shows that the modulus for the honeycomb panel cushion is approximately one-fourth that of the foam cushion. Pressure variations, in the honeycomb panel cushion caused by anatomical features (i.e protrusions) of the wheelchair user, are approximately one-fourth those of foam cushions. Thus, a wheelchair user's anatomical protrusions are less likely to cause local high pressure spots and bed sores if the user sits on a honeycomb panel cushion of the present invention rather than on a typical foam cushion.

The characteristic of honeycomb that makes it an ideal in this area is the relatively flat "plateau region" that characterizes the honeycomb panel's force-deflection property. In FIG. 8, a force-deflection relationship or line 90 is plotted for honeycomb constructed in accordance with the present invention. The force-deflection line 90 is measured over a useable deflection range 91 that ranges from 0 to nearly 80 percent deflection. It will be noted from the figure that there are three distinct regions in the force-deflection line. There are two regions where the modulus (i.e. slope) of force over deflection is very steep, that is, the modulus one region 92 and the bottoming region 94. However, in the plateau modulus region 93, which extends over the plateau region deflection range 95 (i.e. roughly 8–75 percent deflection), the slope of the line is relatively flat. If the honeycomb configuration is properly selected such that the weight of the wheelchair user divided by his sitting area places the user in the middle of the plateau modulus region 93 then local increases or decreases in cushion deflection caused by the user's anatomical features do not appreciably change the pressure exerted on the user. In other words, the user's anatomical protrusions do not create the local high pressure spots which could lead to bedsores and other similar ulcerations. In engineering terminology, the compressive modulus of honeycomb constructed in accordance with the present invention, is less over the plateau region 93 than the compressive modulus of typical foam or gel seat cushions.

Pressure relief by itself is not sufficient to make a satisfactory wheelchair seating cushion because stability must also exist. The best pressure relief system is ineffective if during maneuvers or motions the user tips or slides off the seating area of the cushion. FIG. 9 depicts the self-aligning and supporting characteristic of honeycomb panels of the present invention. A user profile 96 is illustrated as being disposed onto a seat cushion 97 constructed from a honeycomb panel of the present invention. As depicted at 98, in response to the user load, the honeycomb cells tend to align themselves in a buttressing manner with the applied load, even as the load shifts. This effect can be enhanced by selecting a softer honeycomb for the topmost layer of the cushion, in effect creating a buttressed pocket for the lateral portions of the thighs and buttocks. In addition, the anisotropic flexing characteristics of a single and double walled honeycomb provide enhanced stability (i.e. greater shear modulance) in the direction of the double walls. Depending on the needs and activity level of the user, this orientation can be changed to provide the most effective support. For a typical user (this would be support in the fore and aft orientation to help prevent slumping or sliding off the cushion.

Another principal benefit of the honeycomb cushion characterized by the present invention is the ability to tailor it (e.g. varying materials, varying cell configuration and size, etc.) to create the desired cushioning and stabilizing characteristics. The honeycomb panel may be tailored either by adding other components, e.g. fluids, or by not introducing elements such as fluids, foam, or other elements which add costs and reduce durability. As an example, one or more layers of the honeycomb cushion can contain perforated cells walls, which in effect creates a configuration that breathes like an open cell foam but without the foam's porosity and resultant susceptibility to absorbing liquids. A perforated cell honeycomb can provide performance benefits such as quicker recovery from loading and a lower modulus with greater displacement capability than the same configuration in enclosed cell honeycomb. In conjunction with the inflation device and valve arrangement, as illustrated in FIG. 6, the perforated cell cushion with sealed edges can be pressurized to increase the air cushion effect in situations where this is beneficial. Note that a perforated honeycomb air cushion is much more shear resistant, thus more stable, than an equivalent conventional air cushion.

Compression set resistance and resistance to repeated loadings, i.e. good material memory, are also important benefits of a seat cushion having honeycomb of the present invention. The compressive resistance and recovery of both honeycombs and foams comes from bending of the "strut elements" which comprise their geometries. These strut elements are more uniform in honeycomb than foam. Because of this greater uniformity, the compression set resistance and recovery is greater in honeycomb than in foam. In addition, closed cell (faced) honeycomb has the additional resilience afforded by the integral trapped air creating an air spring. Comparison testing of honeycomb and foam configurations used for seating applications in which comparable samples were loaded daily for 16 hours on and 8 hours off, revealed 1.5 to 2.0 percent compression set for the foams compared to less than 1 percent for honeycombed seating cushions of the present invention.

Also, the honeycomb seating cushions of the present invention are light weight and require low maintenance. Weight is an important factor during transfer operations of the wheelchair into and out of a vehicle. Low maintenance and ease of cleaning are important because a wheelchair cushion cannot necessarily be quickly replaced if incontinence or an accidental spill wets the cushion. Honeycomb panels of the present invention typically have solid facing sheets which act as washable barriers that will not absorb water like foam cushions. Nor are honeycomb panels susceptible to puncturing like some of the gel-filled cushions currently available.

Alternately, the honeycomb panels used in the support devices of the present invention could be bare faced (left side, FIG. 5) or faced with perforated facing sheets (right side, FIG. 5). In addition, the cell walls could be perforated. A support cushion having such a panel would allow fluids or moisture to drain through the cushion to keep moisture away from the user's skin. In this manner the user's skin is kept dry and the likelihood of sores or infection is reduced.

Referring now to FIG. 10A through 10E wherein are depicted cross sectional views of an improved cushion in accordance with the present invention. FIG. 10A depicts a single flexible honeycomb panel 100 encased within a vinyl or similar covering 102. The panel 100 is constructed in accordance with the referenced U.S. patents and includes a non-perforated core 104, and facing sheets 103 and 105. Although a single unperforated cell wall honeycomb panel is illustrated it will be appreciated that in the alternative a single perforated core honeycomb panel may be used as an alternative embodiment.

In an alternate embodiment not shown, the panel 100 could be removed from the covering 102 and either or both of the facing sheets 103 and 105 perforated in a predetermined pattern. The area of the perforations could be varied depending on the specific requirements of the user. For example, if a particular user needed greater cushioning for a certain region of his body, the facing sheets for the cushion area supporting this body region could be perforated. In this manner, the cushion apparatus can be individually customized to a user's specific needs. Perforating the cushion in a predetermined manner to accommodate specific user requirements can be utilized for any embodiment of the present invention.

Figure 10B:
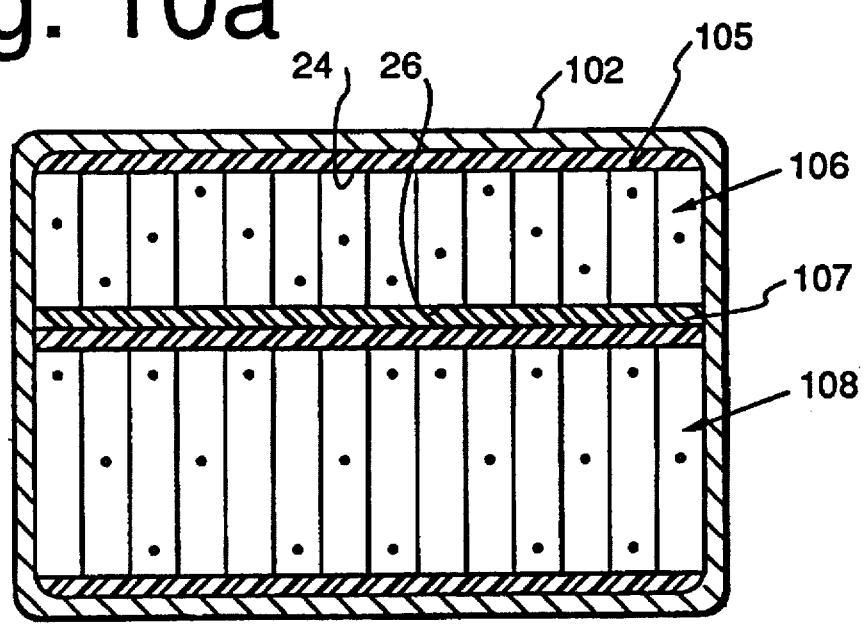

Referring to FIG. 10B which illustrates two perforated core honeycomb panels 106 and 108 encased within the covering 102, it should be noted that honeycomb panel 108 is of different size cell construction than honeycomb panel 108, panel 108 having larger cell walls as illustrated in the figure. Further, although an embodiment with two different honeycomb panels has been illustrated it is possible to construct the cushion with two equally sized honeycomb panels. Alternately, different types of honeycomb panels may be mixed according to the supporting properties desired. For example, panels having different core designs (i.e., cell size, configuration, or materials) may be used. Also, a non-perforated cell wall honeycomb panel may be configured with a perforated cell wall honeycomb panel and vice versa. In addition, two or more layers of honeycomb panels may be stacked in accordance with the descriptions referenced earlier in our prior U.S. patents.

Figure 10C:
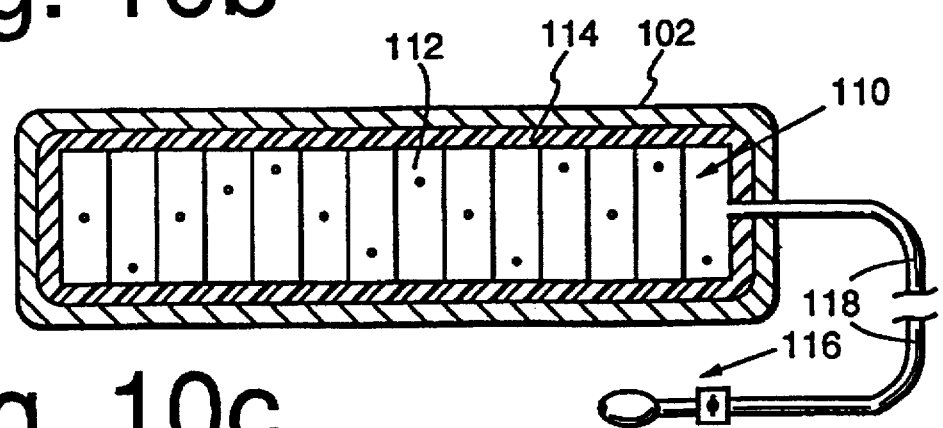

Referring to FIG. 10C which depicts an improved cushion having a pressurized honeycomb panel 110 encased within the covering 102. As described earlier, the pressurized honeycomb panel 110 is comprised of a perforated honeycomb core 112, encased within a non-perforated facing sheet covering 114, that is in communication with a pump subsystem 116, via a conduit 118. In this manner, the pressurized honeycomb panel 110 may be alternatingly pressurized to vary the support characteristics of the honeycomb core 112 contained within.

Referring to FIG. 10D which illustrates a multi-layer cushion having a plurality of honeycomb panels contained within a covering 102. In this particular embodiment, the pressurized honeycomb panel 110 is attached to a non-perforated core honeycomb panel 120. Alternately, two pressurized honeycomb panels could be used with each panel system having different properties, i.e. different materials and/or cell configurations and sizes. In addition, each individual panel could have different stiffnesses in different areas. For example, a stiffer area would be placed in a forward area where the user's legs and thighs are supported, and a softer area placed beneath the buttocks area. This can be accomplished by constructing the panels with more than one cell configuration. In another embodiment not depicted in the figure, the panel 120 could have perforated cells walls rather than non-perforated cell walls as illustrated. Finally, although two honeycomb panels are depicted, more than two panels could be employed, and the arrangement of panels could have a pressurized panel disposed between non-pressurized panels or a non-pressurized panel disposed between two pressurized panels.

FIG. 10E illustrates a multi-layer apparatus 164 having a two-layer panel subsystem 166 disposed onto a pump subsystem 168. The panel subsystem 166 includes pressurized honeycomb panels 170 and 172. Each panel has perforated cell walls 176, 178 and facing sheets 170a and 170b, 172a and 172b. Each facing sheet has a plurality of perforations 176a and 176b, and 178a and 178b. The two panels 170 and 172 are covered by a permeable covering 174 that permits the passage of fluid (e.g. air) from the panels 170 and 172. The pump subsystem 168 includes a base plate 180 having a channel 182 formed therein so that the channel can be communicatively coupled, via a conduit 186, to a pump or fan device 188. A plurality of exhaust ports 184 are formed in a surface 181 of the base plate 180 and intersect with the channel 182. The pump device 188 is also communicatively coupled to a fluid source (not shown) via an input conduit 189.

Fluid (e.g. air) is drawn from the fluid source, in the direction indicated by the arrow 190, by the pump device 188. Fluid is passed through the conduit 186 into the channel 182 and out through the ports 184 of the base plate 180. The fluid passes through the contacting permeable covering 174 and into the panel 172, via the perforations 178b in the facing sheet 172b. The fluid passes from the panel 172 to the panel 170 via the perforations 178, 178a, and 176b. Finally, the fluid exits the panel 170, via the perforations 176 and 176a, out through the permeable covering 174. The fluid exiting from the apparatus cools and comforts a user sitting thereon.

It will be appreciated that only one panel or even additional panels may be utilized to maximize the comfort and support for a particular user. Also, a perforated covering may be used in lieu of the permeable covering 174. Further, the pump device 188 may draw from a variety of fluid sources other than the ambient environment.

Although not illustrated, an alternate pump subsystem may include a pump device communicatively coupled to a porous conduit. The conduit being similarly disposed as the base plate 180 or, in the alternative, the conduit could be disposed underneath the uppermost panel (e.g. between panels 170 and 172) for supplying cooling air through panel 172 to the user.

FIG. 11 illustrates a partially broken view of yet another alternative embodiment of an improved cushion 122. The cushion 122 includes a honeycomb core 126, facing sheets 128 and 129, a foam pad 130, all encased within a covering 124. As more clearly illustrated in FIG. 12, the honeycomb core 126 is disposed on top of the foam 130. Although a non-perforated honeycomb core is illustrated, a perforated cell wall honeycomb core could be utilized, or alternatively a pressurized honeycomb panel system could be utilized. FIG. 13 illustrates still another embodiment of the seat cushion 122 wherein a plurality of cavities 132 and 134 are disposed on the surface of the seat cushion 122. Within each cavity a separate honeycomb core insert 136 is placed. The particular inserts illustrated in FIG. 13 are non-perforated cell wall honeycomb core inserts with top and bottom facing sheets 138, 140. In the alternative, the core inserts 136 could be constructed from perforated cell wall honeycomb panels or pressurized honeycomb panels. Although only two core inserts have been illustrated in the figure, a plurality of core inserts could be installed on numerous locations on the surface of the cushion to vary the support characteristics of the cushion to conform to the individual needs of the wheelchair user. Thus, core inserts of varying stability and stiffness could be interchanged to individually tailor the support and pressure relief characteristics of the cushion. Although not illustrated, in a multi-layer cushion apparatus, the core inserts could be removable from any of the panels (i.e. in a three layer apparatus, the core insert could be removable from the second panel).

A logical extension of the anatomical support cushion described above is a pad used for supporting the buttocks, shoulders, head, and other parts of the anatomy of a reclining or sitting user. FIG. 14 is a perspective view of a bed 142 supported on a standard hospital bed frame 144, the bed 142 having carrying straps 146 disposed at numerous location around its periphery. The bed 142 of the present invention is not limited to use in a hospital environment but may be used in other human care facilities (e.g. nursing, convalescent, retirement homes, etc.) or other environments.

FIG. 15 depicts an enlarged perspective view of the bed 142 illustrated in FIG. 14, but with the carrying straps 146 omitted for clarity. The bed 142 includes a conventional mattress 150 with an improved pad, liner or "topper" 148 disposed thereon and which covers the entire mattress 150. It will be appreciated, however, that the pad 148 could be sized such that it covers only a portion or discrete portions of the mattress 150. As illustrated in the cutaway portion, the pad 148 includes a single panel 151 with a honeycomb core panel 152 having an upper facing sheet 154 and a lower facing sheet (not shown) bonded to a lower extremity of the cell walls of the core.

FIG. 16 is a cross-sectional view taken along the line 16—16 of FIG. 15, and depicts the construction of the pad 148 and mattress 150. The mattress 150 is of conventional design and includes a foam core 156 encased within a mattress covering 158. The pad 148 includes the honeycomb core 152, facing sheets 154 and 160, and a covering 162 encasing the panel 152 and facing sheets 154 and 160.

Figure 17:
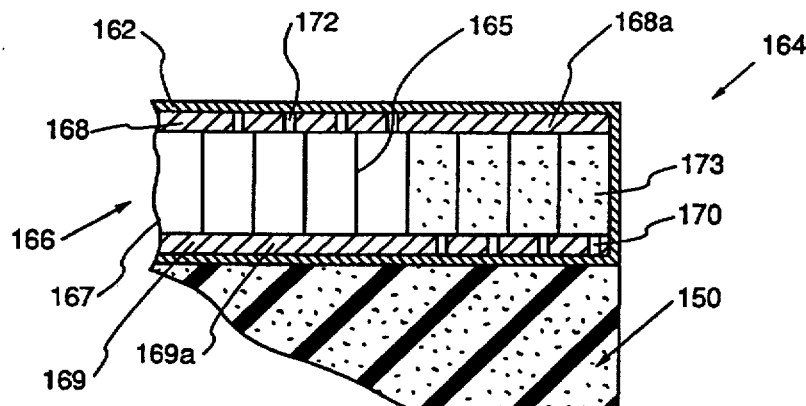
FIGS. 17–19 are partial cross-sectional views of a pad or liner of the present invention disposed onto a conventional mattress, the pad having a single flexible thermoplastic elastomeric honeycomb panel.
Figure 18:
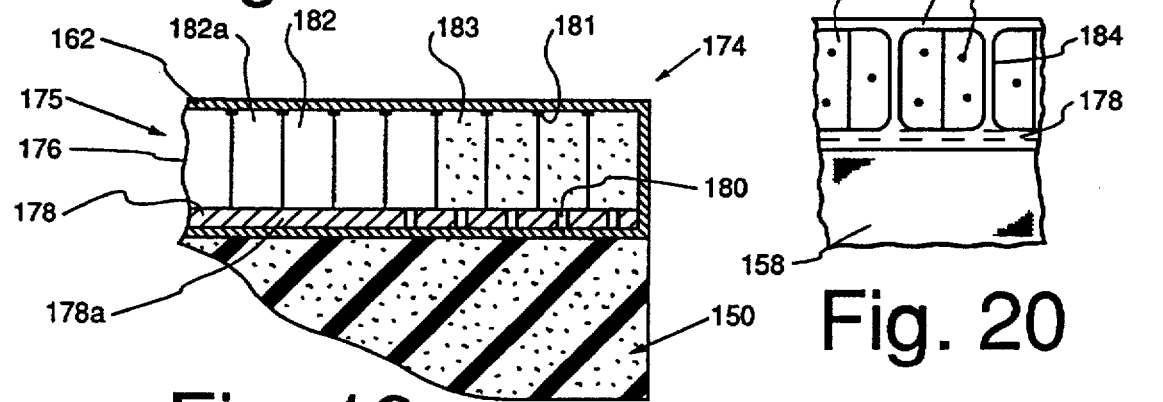
Figure 19:
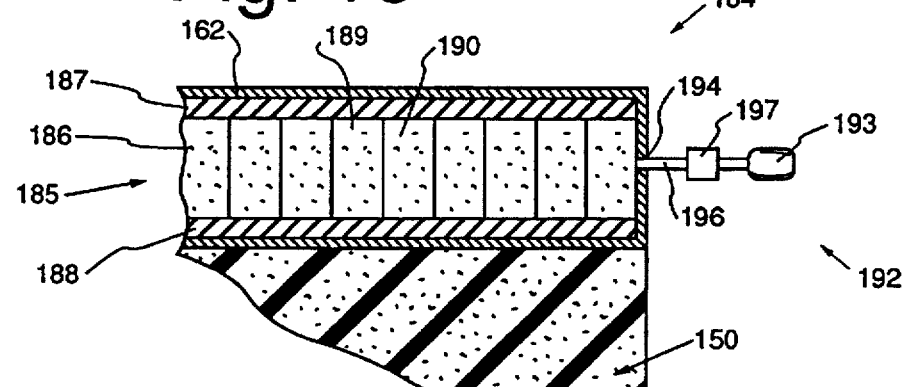
Figure 21:
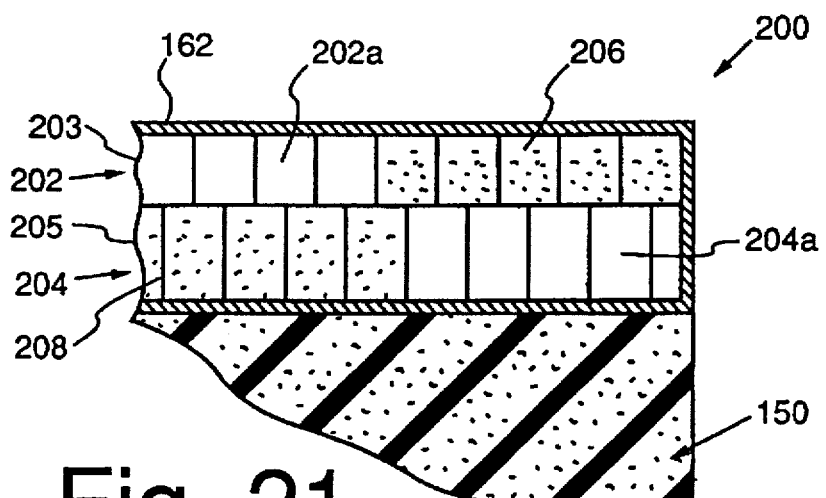
FIGS. 21–25 are partial cross-sectional views of a pad or liner of the present invention disposed onto a conventional mattress, the pad having two flexible thermoplastic elastomeric honeycomb panels, one panel disposed onto the other panel.

FIGS. 17–19 are partial cross-sectional views of a portion of an embodiment of an improved pad disposed onto the conventional mattress 150. FIG. 17 illustrates a pad 164 having one flexible thermoplastic elastomeric honeycomb panel 166. The core 167 is covered at its upper and lower extremities by facing sheets 168, 169, respectively. The facing sheets 168, 169 may be solid, as illustrated by the portions 168a and 169a. Alternately, one or both facing sheets 168, 169 may be formed with perforations 172, 170. Also, the cell walls 165 of the core 167 may be solid walls, or some cell walls may be formed with perforations 173.

Although a specific portion of a facing sheet or a specific region of a core are illustrated with perforations, it will be appreciated, that perforations could be formed in any portion of a facing sheet or in any region of a core.

FIG. 18 depicts a preferred embodiment of the present invention. A mattress pad 174 includes a panel 175 having a single layer of flexible thermoplastic elastomeric honeycomb core 176 encased within the mattress covering 162. The covering 162 is fabricated from a porous or fabric material. Typical thicknesses of the core 176 range from 2 to 2½ inches. The honeycomb core 176 is faced at the lower extremity of each cell wall by a facing sheet 178. The upper extremity of each cells of the core 176 is slightly planarized, as shown by planarized extremities 181. The facing sheet 178, and some or all of the cells walls 182 are formed with a plurality of perforations 180 and 183, respectively. In the preferred embodiment, fluid and moisture (resulting from user incontinence or other sources) can drain from an upper surface and through the cushion, thereby keeping the upper surface, which is in contact with the user's skin, dry.

It will be appreciated that, in an alternate embodiment (not shown) of the pad 174, the facing sheet 178 would be bonded to the upper extremity of the core 176, and the lower extremities of each cell wall would be planarized. Also, the covering 162 could be constructed of materials impervious to gas and fluids. Further, the cell walls 182 of the core 176 and the facing sheet 178 could be solid, as illustrated by the portions 182a and 178a, respectively.

FIG. 19 depicts still another alternate embodiment of an improved mattress pad 184 having a panel 185 which includes a honeycomb core 186 having facing sheets 187 and 188 attached to the upper and lower extremities of a core 186, respectively. The covering 162 encases the core 186 and facing sheets 187, 188. The honeycomb core 186 includes cell walls 189 having perforations 190 formed therein. Each cell of the honeycomb core 186 is in communication with a pump subsystem 192. A bulb pump 193 is in communication with the core 186 via a conduit 196, and a passageway 194 formed in the covering 162. An exhaust valve 197 is disposed between the pump 193 and the core 186. The pump subsystem 192 operates in an identical manner as described above.

Figure 20:
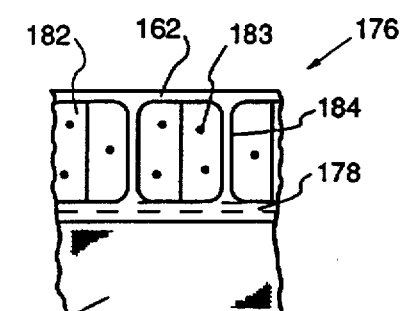
FIG. 20 is a elevational view of a portion of a pad or liner disposed onto a conventional mattress, showing side vents formed in an outer casing of the pad.

FIG. 20 is a side elevation view of an alternate embodiment of the covering 162 encasing the core 176 (FIG. 18). Generally, a permeable covering is used to encase the honeycomb core and associated components. In some embodiments the permeability of the covering 162 can be increased by forming side openings or vents 184 in the covering 162. The vents 184 allow the cells of the core 176 to communicate directly, via perforations 183, with the outside atmosphere.

FIGS. 21-24 illustrate yet other alternate embodiments of an improved anatomical support mattress pad having two honeycomb core panels 202 and 204 disposed one atop the other. A mattress pad 200 includes honeycomb core panels 202 and 204 disposed one atop the other and encased within the covering 162.

It will be appreciated that the covering 162 may be permeable and may be constructed with side openings or vents (FIG. 20), or the covering 162 may be impervious to gas and fluids.

The cell walls of each core may be solid, i.e. non-perforated as illustrated by regions 202a and 204a for the cores 203 and 205, respectively. Alternately, some or all of the cell walls of the cores 203 and 205 may be formed with a plurality of perforations 206 and 208.

A distinguishing feature of each of the embodiments illustrated in FIGS. 21 to 24 is the number and location of facing sheets used. In the mattress pad 200 (FIG. 21) no facing sheet is used.

Figure 22:
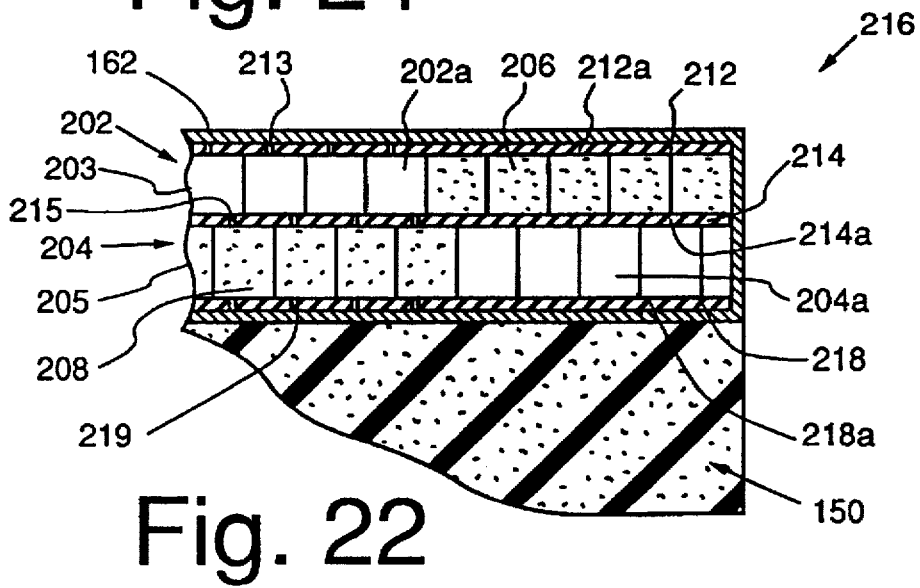

In FIG. 22, a pad 216 having three facing sheets 212, 214, and 218 is shown. Each facing sheet may be solid, i.e. non-perforated as illustrated in the regions 212a, 214a, or 218a, or may be formed with a plurality of perforations 213, 215, or 219, respectively. Facing sheet 212 is thermal compression bonded to the upper extremity of core 203, and facing sheet 218 is similarly bonded to the lower extremity of core 208. Facing sheet 214 is thermal compression bonded between the adjacent lower extremity of core 202 and the upper extremity of core 204, i.e. sheet 214 is "sandwiched" between cores 202 and 204.

Figure 23:
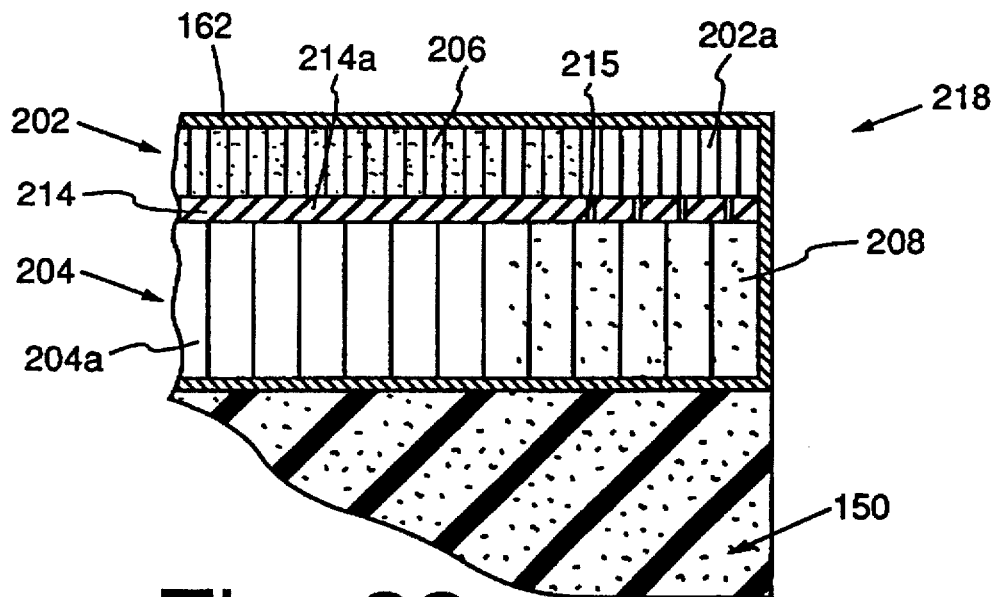

In FIG. 23, a pad 218 having a single facing sheet is shown. The facing sheet 214 is disposedly bonded between the cores 203 and 205. It will be appreciated, however, that the facing sheet 214 could be bonded to either the lower extremity of core 205 or the upper extremity of core 202. Also, the facing sheet may be solid, i.e. non-perforated as illustrated in the region 214a, or may be formed with a plurality of perforations 215.

Figure 24:
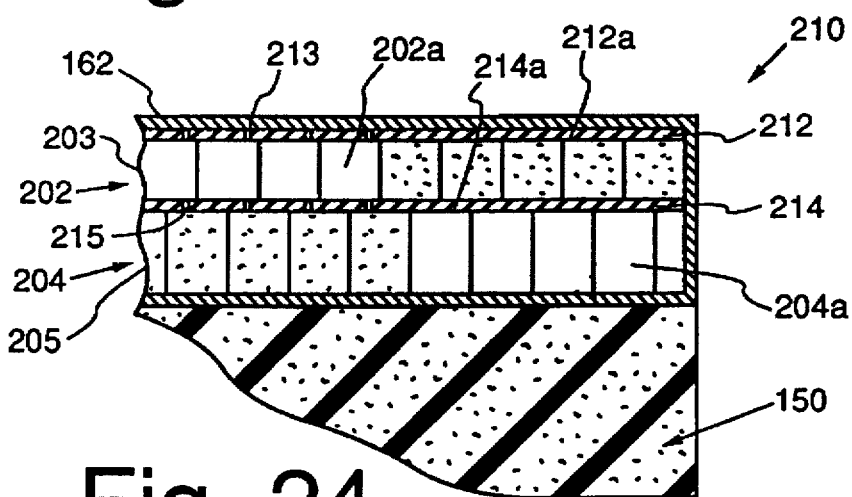

FIG. 24 illustrates a mattress pad 210 having two facing sheets. The facing sheet 212 is bonded to the upper extremity of core 203 of the upper panel 202, and the facing sheet 214 is sandwiched between the cores 203 and 205. It will be appreciated, however, that the facing sheets 212, 214 could be disposed at other locations in the pad 210. For example, the sheet 214 could remain disposed between the cores 203 and 205, but the sheet 212 could be bonded to the lower extremity of core 205. Also, the sheet 212 could remain attached to the upper extremity of core 202 but the sheet 214 could be bonded to the lower extremity of core 205. Further, each facing sheet may be solid, i.e. non-perforated as illustrated in the regions 212a, 214a, or may be formed with a plurality of perforations 213, 215.

Figure 25:
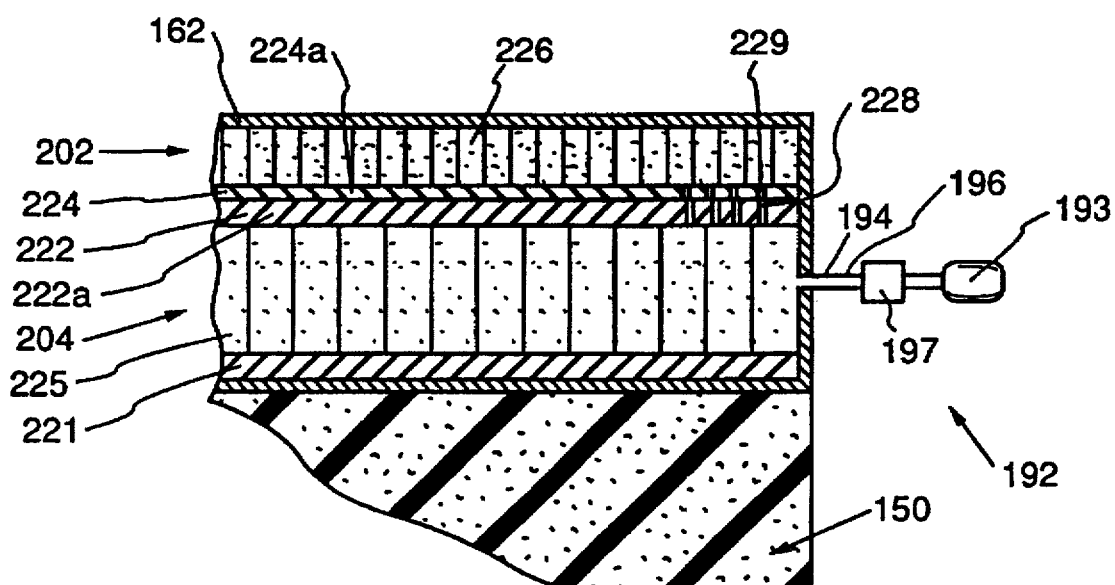

FIG. 25 illustrates yet another alternate embodiment of an improved support mattress pad 220. In this embodiment, the honeycomb core panel 202 and a honeycomb core panel 204 are disposed adjacent and one atop the other, and are encased within a mattress covering 206. The pump subsystem 192 is in communication with the lower honeycomb panel 204. The bulb pump 193 is in communication with the cells of the panel 204 via a conduit 196, and a passageway 194 formed in the casing 162. An exhaust valve 197 is disposed in the conduit 196 between the pump 193 and the panel 204. The pump subsystem 192 operates in a manner identical to the pump subsystem described above. The panel 204 includes an upper facing sheet 222 and a lower facing sheet 221. Also, the panel 204 has perforations 225 formed in the cell walls therein.

The upper core panel 202 has a bottom facing sheet 224 which is bonded to the upper facing sheet 222 of the core 204. The upper core panel 202 also has perforations 226 formed in the cell walls therein. In addition, a plurality of holes 229, 228 are formed through the adjacent facing sheets 224 and 222, respectively, to enable communication between the cells of the panels 202 and 204. In this manner, the pump subsystem 192 is in communication with the cells of each of the panels 202 and 204.

Although not illustrated, it will be appreciated that more than two layers of honeycomb panels may be used. Also, each honeycomb core panels may be sandwiched between facing sheet pairs, or may have a facing sheet on either its upper or its lower surface, or may have no facing sheets at all. In addition, the facing sheets may be perforated as illustrated or may be completely solid as shown in the portion 222a, 224a of facing sheet 222, 224.

It will also be appreciated that any of the flexible thermoplastic elastomeric pads 164, 174, 184, 200, 210, 216, 218, and 220 may be used as a mattress, rather than as a topper or liner for a mattress.

Although preferred, and alternate embodiments of the present invention have been disclosed above, it will be appreciated that numerous alterations and modifications thereof will no doubt become apparent to those skilled in the art after having read the above disclosures. For example, the anatomical support cushions may be configured in any appropriate shape, with multiple panels and with various combinations of perforated and non-perforated core panels, and with core walls and/or face sheet perforations the number and/or hole size of which are tailored to achieve desired damping characteristics. It is therefore intended that the following claims may be interpreted as covering all such alterations and modifications as fall within the true spirit and scope of the invention.

What is claimed is:

1. An improved mattress pad or liner comprising:
   a first panel including
   i) a first rectangularly shaped honeycomb core formed of undulated strips of resilient thermoplastic material, thermal compression bonded together and expanded to form cell walls defining a plurality of contiguous regularly shaped cells;
   ii) first means for maintaining said first core in its expanded configuration so that it can anisotropically flex to stabilize and spread a load applied thereto; and iii) casing means for encasing said first core and said maintaining means.

2. An improved mattress pad or liner as recited in claim 1, wherein said means for maintaining includes:
   a) a planarizing thermal compression deformation of a first face of said first core formed by upper extremities of said cell walls.

3. An improved mattress pad or liner as recited in claim 2, wherein said means for maintaining further includes:
   a) a planarizing thermal compression deformation of a second face of said first core formed by lower extremities of said cell walls.

4. An improved mattress pad or liner as recited in claim 3, wherein said means for maintaining further includes:
   a) a first facing sheet of resilient thermoplastic material bonded to said second face.

5. An improved mattress pad or liner as recited in claim 4, further including:
   a) at least one other panel affixed to said first panel, having
      i) a second honeycomb core formed of undulated strips of resilient thermoplastic material, thermal compression bonded together to form cell walls defining a plurality of contiguous regularly shaped cells; and
      ii) second means for maintaining said second core in its expanded configuration so that it can anisotropically flex to stabilize and spread a load applied thereto.

6. An improved mattress pad or liner as recited in claim 4, wherein said first facing sheet is perforated to permit fluid flow therethrough.

7. An improved mattress pad or liner as recited in claim 6, further including:
   a) at least one other panel disposed onto said first panel and including
      i) a second honeycomb core formed of undulated strips of resilient thermoplastic material, thermal compression bonded together to form cell walls defining a plurality of contiguous regularly shaped cells; and
      ii) second means for maintaining said second core in its expanded configuration so that it can anisotropically flex to stabilize and spread a load applied thereto.

8. An improved mattress pad or liner as recited in claim 6, wherein said cell walls of at least some of said cells of said first panel have perforations therein to permit fluid flow from cell to cell.

9. An improved mattress pad or liner as recited in claim 8, wherein said encasing means is made of a material permeable to fluids.

10. An improved mattress pad or liner as recited in claim 8, further including:
   a) at least one other panel affixed to said first panel and including
      i) a second honeycomb core formed of undulated strips of resilient thermoplastic material, thermal compression bonded together to form cell walls defining a plurality of contiguous regularly shaped cells; and
      ii) second means for maintaining said second core in its expanded configuration so that it can anisotropically flex to stabilize and spread a load applied thereto.

11. An improved mattress pad or liner as recited in claim 4, wherein said means for maintaining further includes:
   a) a second facing sheet of resilient thermoplastic material bonded to said first face.

12. An improved mattress pad or liner as recited in claim 11, wherein said first facing sheet is perforated.

13. An improved mattress pad or liner as recited in claim 12, wherein said second facing sheet is perforated.

14. An improved mattress pad or liner as recited in claim 13, wherein said cell walls of at least some of said cells of said first panel have perforations therein.

15. An improved mattress pad or liner as recited in claim 14, wherein said encasing means is made of a material permeable to fluids.

16. An improved mattress pad or liner as recited in claim 11, wherein said cell walls of at least some of said cells of said first panel have perforations therein.

17. An improved mattress pad or liner as recited in claim 16, wherein said first facing sheet and said second facing sheet are sealingly joined together about the perimeter of said first core to provide a hermetically sealed chamber.

18. An improved mattress pad or liner as recited in claim 17, further including:
   a) means fluid-communicatively coupled to said first panel for selectively adding gas to or subtracting gas from said sealed chamber, said gas flowing through the perforations of said walls to change certain characteristics of said first panel.

19. An improved mattress pad or liner as recited in claim 18, further including:
   a) at least a second panel affixed to said first panel and including
      i) a second rectangularly shaped honeycomb core formed of undulated strips of resilient thermoplastic material, thermal compression bonded together to form cell walls defining a second plurality of contiguous regularly shaped cells; and
      ii) second means for maintaining said second core in its expanded configuration so that it can anisotropically flex to stabilize and spread a load applied thereto.

20. An improved mattress pad or liner as recited in claim 1, further including:
   a) at least one other panel affixed to said first panel and including
      i) a second rectangularly shaped honeycomb core formed of undulated strips of resilient thermoplastic material, thermal compression bonded together to form cell walls defining a plurality of contiguous regularly shaped cells; and
      ii) second means for maintaining said second core in its expanded configuration so that it can anisotropically flex to stabilize and spread a load applied thereto.

* * * * *